(12) United States Patent
Hsia

(10) Patent No.: US 11,271,422 B2
(45) Date of Patent: Mar. 8, 2022

(54) SOLID-STATE LIGHTING WITH AN EMERGENCY POWER SYSTEM

(71) Applicant: Aleddra Inc., Renton, WA (US)

(72) Inventor: Chungho Hsia, Bellevue, WA (US)

(73) Assignee: Aleddra Inc., Renton, WA (US)

( * ) Notice: Subject to any disclaimer, the term of this patent is extended or adjusted under 35 U.S.C. 154(b) by 0 days.

(21) Appl. No.: 17/213,519

(22) Filed: Mar. 26, 2021

(65) Prior Publication Data

US 2021/0218271 A1 Jul. 15, 2021

Related U.S. Application Data

(63) Continuation-in-part of application No. 17/151,606, filed on Jan. 18, 2021, which is a continuation-in-part of application No. 17/122,942, filed on Dec. 15, 2020, which is a continuation-in-part of application No. 17/099,450, filed on Nov. 16, 2020, which is a continuation-in-part of application No. 17/076,748, filed on Oct. 21, 2020, which is a continuation-in-part of application No. 17/026,903, filed on Sep. 21, 2020, which is a continuation-in-part of application No.
(Continued)

(51) Int. Cl.
*H02J 1/10* (2006.01)
*H02J 9/06* (2006.01)
*H05B 45/3725* (2020.01)
*H02J 7/00* (2006.01)
*H02J 7/04* (2006.01)

(52) U.S. Cl.
CPC ............ *H02J 9/065* (2013.01); *H02J 7/0047* (2013.01); *H02J 7/04* (2013.01); *H05B 45/3725* (2020.01)

(58) Field of Classification Search
CPC .. H02J 9/065; H02J 7/0047; H02J 7/04; H02J 9/067; H02J 7/02; H02J 9/061; H02J 7/00714; H02J 7/0068; H02J 7/022; H02J 2207/20; H02J 7/007; H02J 9/06; H05B 45/3725; H05B 45/10; H05B 45/39; Y02B 20/30; Y02D 10/00; Y04S 40/18; G06F 13/385
See application file for complete search history.

(56) References Cited

U.S. PATENT DOCUMENTS

| | | | | |
|---|---|---|---|---|
| 4,988,889 A | * | 1/1991 | Oughton, Jr. | ...... H05B 45/3725 307/66 |
| 5,867,377 A | * | 2/1999 | Suranyi | ................... H02J 9/061 363/60 |

(Continued)

*Primary Examiner* — Omar Rojas Cadima
(74) *Attorney, Agent, or Firm* — Han IP PLLC; Andy M. Han

(57) ABSTRACT

An emergency lighting and power system comprises a rechargeable battery, an LED driving circuit, and a charging and discharging control circuit. The emergency lighting and power system is intended to automatically supply illumination or power or both in an event of failure of normal power supply. The LED driving circuit is configured to convert a terminal voltage from the rechargeable battery into an AC voltage to operate a luminaire when a line voltage from AC mains is unavailable. The charging and discharging control circuit comprises at least two relay switches configured to sense a loss of normal power supply, to switch between normal power and an emergency power to operate the luminaire in proper situations, and to meet regulatory requirements without operational ambiguity and safety issues.

21 Claims, 4 Drawing Sheets

Related U.S. Application Data

17/016,296, filed on Sep. 9, 2020, which is a continuation-in-part of application No. 16/989,016, filed on Aug. 10, 2020, now Pat. No. 11,122,658, which is a continuation-in-part of application No. 16/929,540, filed on Jul. 15, 2020, now Pat. No. 11,116,057, which is a continuation-in-part of application No. 16/904,206, filed on Jun. 17, 2020, now Pat. No. 11,102,864, which is a continuation-in-part of application No. 16/880,375, filed on May 21, 2020, now Pat. No. 11,172,551, which is a continuation-in-part of application No. 16/861,137, filed on Apr. 28, 2020, now Pat. No. 10,992,161, which is a continuation-in-part of application No. 16/830,198, filed on Mar. 25, 2020, now Pat. No. 10,869,373, which is a continuation-in-part of application No. 16/735,410, filed on Jan. 6, 2020, now Pat. No. 10,660,179, which is a continuation-in-part of application No. 16/694,970, filed on Nov. 25, 2019, now Pat. No. 10,602,597, which is a continuation-in-part of application No. 16/681,740, filed on Nov. 12, 2019, now Pat. No. 10,959,310, which is a continuation-in-part of application No. 16/664,034, filed on Oct. 25, 2019, now Pat. No. 10,660,184, which is a continuation-in-part of application No. 16/572,040, filed on Sep. 16, 2019, now Pat. No. 10,645,782, which is a continuation-in-part of application No. 16/547,502, filed on Aug. 21, 2019, now Pat. No. 10,485,073, which is a continuation-in-part of application No. 16/530,747, filed on Aug. 2, 2019, now Pat. No. 10,492,265, which is a continuation-in-part of application No. 16/458,823, filed on Jul. 1, 2019, now Pat. No. 10,485,065, which is a continuation-in-part of application No. 16/432,735, filed on Jun. 5, 2019, now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, now Pat. No. 10,390,394, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| 7,414,869 B2 * | 8/2008 | Nakahori | H02M 3/3376 363/71 |
| 8,179,698 B2 * | 5/2012 | Jang | H02M 3/33576 363/17 |

* cited by examiner

SOLID-STATE LIGHTING WITH AN EMERGENCY POWER SYSTEM

CROSS-REFERENCE TO RELATED APPLICATIONS

The present disclosure is part of a continuation-in-part (CIP) application of U.S. patent application Ser. No. 17/151,606, filed 18 Jan. 2021, which is part of CIP application of Ser. No. 17/122,942, filed 15 Dec. 2020, which is part of CIP application of U.S. patent application Ser. No. 17/099,450, filed 16 Nov. 2020, which is part of CIP application of U.S. patent application Ser. No. 17/076,748, filed 21 Oct. 2020, which is part of CIP application of U.S. patent application Ser. No. 17/026,903, filed 21 Sep. 2020, which is part of CIP application of U.S. patent application Ser. No. 17/016,296, filed 9 Sep. 2020, which is part of CIP application of U.S. patent application Ser. No. 16/989,016, filed 10 Aug. 2020, which is part of CIP application of U.S. patent application Ser. No. 16/929,540, filed 15 Jul. 2020, which is part of CIP application of U.S. patent application Ser. No. 16/904,206, filed 17 Jun. 2020, which is part of CIP application of U.S. patent application Ser. No. 16/880,375, filed 21 May 2020, which is part of CIP application of U.S. patent application Ser. No. 16/861,137, filed 28 Apr. 2020, which is part of CIP application of U.S. patent application Ser. No. 16/830,198, filed 25 Mar. 2020 and issued as U.S. Pat. No. 10,869,373 on 15 Dec. 2020, which is part of CIP application of U.S. patent application Ser. No. 16/735,410, filed 6 Jan. 2020 and issued as U.S. Pat. No. 10,660,179 on 19 May 2020, which is part of CIP application of U.S. patent application Ser. No. 16/694,970, filed 25 Nov. 2019 and issued as U.S. Pat. No. 10,602,597 on 24 Mar. 2020, which is part of CIP application of U.S. patent application Ser. No. 16/681,740, filed 12 Nov. 2019 and issued as U.S. Pat. No. 10,959,310 on 23 Mar. 2021, which is part of CIP application of U.S. patent application Ser. No. 16/664,034, filed 25 Oct. 2019 and issued as U.S. Pat. No. 10,660,184 on 19 May 2020, which is part of CIP application of U.S. patent application Ser. No. 16/572,040, filed 16 Sep. 2019 and issued as U.S. Pat. No. 10,645,782 on 5 May 2020, which is part of CIP application of U.S. patent application Ser. No. 16/547,502, filed 21 Aug. 2019 and issued as U.S. Pat. No. 10,485,073 on 19 Nov. 2019, which is part of CIP application of U.S. patent application Ser. No. 16/530,747, filed 2 Aug. 2019 and issued as U.S. Pat. No. 10,492,265 on 26 Nov. 2019, which is part of CIP application of U.S. patent application Ser. No. 16/458,823, filed 1 Jul. 2019 and issued as U.S. Pat. No. 10,485,065 on 19 Nov. 2019, which is part of CIP application of U.S. patent application Ser. No. 16/432,735, filed 5 Jun. 2019 and issued as U.S. Pat. No. 10,390,396 on 20 Aug. 2019, which is part of CIP application of U.S. patent application Ser. No. 16/401,849, filed 2 May 2019 and issued as U.S. Pat. No. 10,390,395 on 20 Aug. 2019, which is part of CIP application of U.S. patent application Ser. No. 16/296,864, filed 8 Mar. 2019 and issued as U.S. Pat. No. 10,390,394 on 20 Aug. 2019, which is part of CIP application of U.S. patent application Ser. No. 16/269,510, filed 6 Feb. 2019 and issued as U.S. Pat. No. 10,314,123 on 4 Jun. 2019, which is part of CIP application of U.S. patent application Ser. No. 16/247,456, filed 14 Jan. 2019 and issued as U.S. Pat. No. 10,327,298 on 18 Jun. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) lighting systems and more particularly to an LED lighting system that includes an emergency lighting and power system configured to operate the luminaire no matter whether a line voltage from alternate-current (AC) mains is available or not.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an AC mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

Furthermore, the AC mains-operable LED lamps can easily be used with emergency lighting, which is especially important in this consumerism era. The emergency lighting systems in retail sales and assembly areas with an occupancy load of 100 or more are required by codes in many cities. Occupational Safety and Health Administration (OSHA) requires that a building's exit paths be properly and automatically lighted at least ninety minutes of illumination at a minimum of 10.8 lux so that an employee with normal vision can see along the exit route after the building power becomes unavailable. This means that emergency egress lighting must operate reliably and effectively during low visibility evacuations. To ensure reliability and effectiveness of backup lighting, building owners should abide by the National Fire Protection Association's (NFPA) emergency egress light requirements that emphasize performance, operation, power source, and testing. OSHA requires most commercial buildings to adhere to the NFPA standards or a significant fine. Meeting OSHA requirements takes time and investment, but not meeting them could result in fines and even prosecution. If a building has egress lighting problems that constitute code violations, the quickest way to fix is to replace existing lamps with multi-function LED lamps that have an emergency light package integrated with the normal lighting. The code also requires the emergency lights be inspected and tested to ensure they are in proper working conditions at all times. It is, therefore, the manufacturers' responsibility to design an LED lamp, an LED luminaire, or an LED lighting system with an emergency lighting and power system such that after the LED lamp or the LED luminaire is installed on a ceiling or in a room, the emergency lighting and power system can be readily connected with the LED lamp, the LED luminaire, or others on site to meet regulatory requirements, especially without further retrofits or modifications of the LED lamp or the LED luminaire.

SUMMARY

An LED lighting system comprising a luminaire and an emergency lighting and power system is used to replace a fluorescent or an LED lamp normally operated with the AC mains. The luminaire comprises one or more LED arrays with a forward voltage across thereon and a power supply unit that powers the one or more LED arrays. The emergency lighting and power system comprises a rechargeable battery with a terminal voltage, a charging and discharging control circuit, and an LED driving circuit configured to receive power from the rechargeable battery and to generate a first supplied voltage, $V_1$, with a predetermined power and a second direct-current (DC) voltage, $V_{D2}$, when the line voltage from the AC mains is unavailable. The first supplied voltage, $V_1$, is compatible to a voltage in an input operating voltage range of the power supply unit whereas the second DC voltage is compatible to a voltage in a range of 0-to-10 volts. The charging and discharging control circuit comprises at least two relay switches, one configured to couple either the line voltage from the AC mains or the at least one first supplied voltage, $V_1$, to the power supply unit to operate thereon, the other one configured to couple the terminal voltage to the LED driving circuit and to operate thereon.

The power supply unit comprises two main electrical conductors, a main full-wave rectifier, and an input filter. The two main electrical conductors are configured to couple to the emergency lighting and power system, receiving either the line voltage from the AC mains or the first supplied voltage, $V_1$. The main full-wave rectifier is coupled to the two main electrical conductors to convert either the line voltage from the AC mains or the first supplied voltage, $V_1$, into a fourth DC voltage. The input filter is configured to suppress electromagnetic interference (EMI) noises. The power supply unit further comprises a power switching converter comprising a main transformer and a power factor correction (PFC) and power switching circuit. The PFC and power switching circuit is coupled to the main full-wave rectifier via the input filter and configured to improve a power factor, to reduce voltage ripples, and to convert the fourth DC voltage into a fifth DC voltage. The fifth DC voltage is configured to couple to the one or more LED arrays to operate thereon. The power switching converter further comprises a pulse width modulation (PWM) control circuit and a pair of dimming input ports configured to receive a 0-to-10 V signal, a 1-to-10 V signal, a PWM signal, or a signal from a variable resistor for luminaire dimming applications. The PFC and power switching circuit is generally a current source, in which when the one or more LED arrays require more current than a predetermined maximum, the fifth DC voltage drops accordingly to maintain power conservation. In other words, when the emergency lighting and power system is cascaded by the luminaire powered by the emergency lighting and power system that only provides a fraction of power compared with a rated power of the luminaire, there exists an operating uncertainty that a driving voltage and current provided by the emergency lighting and power system to drive the one or more LED arrays may fall into an unstable operating situation. That is, when the one or more LED arrays require more current than a predetermined maximum, the fifth DC voltage drops below the forward voltage of the one or more LED arrays, resulting in an operating failure of the one or more LED arrays. When the power supply unit recovers to start tracking current, the fifth DC voltage recovers to an original level exceeding the forward voltage, thus temporarily operating the one or more LED arrays. Such a voltage and current competition continues, creating a phenomenon called luminaire strobing. Therefore, the emergency lighting and power system must provide an additional signal to control the power supply unit to stably and efficiently operate the one or more LED arrays at low power conditions.

The emergency lighting and power system further comprises a full-wave rectifier assembly comprises a full-wave rectifier and at least one capacitor coupled between "L" of the AC mains and the full-wave rectifier and configured to reduce a line voltage appeared at "L" into a relatively low AC voltage. It should be appreciated that a capacitive reactance is defined as: $X_C=1/\omega C=1/2\pi fC$, where $X_C$ is the capacitive reactance, $\omega$ is the angular frequency, f is the frequency of the line voltage of the AC mains in Hertz, and C is the capacitance. Therefore, the at least one capacitor can effectively reduce the line voltage appeared at "L" into the relatively low AC voltage. The full-wave rectifier is configured to convert the relatively low AC voltage into a first DC voltage, without using an extra DC-to-DC converter. Therefore, no extra electronic driver such as the extra DC-to-DC converter is needed in this case. It should be appreciated that a DC-to-DC converter is an electronic circuit or electromechanical device that, converts a source of DC from one voltage level to another. It is a type of electric power converter. The first DC voltage, $V_{D1}$, is with respect to the ground reference. The charging and discharging control circuit comprises a first relay switch and a second relay switch. The first relay switch and the second relay switch respectively comprise a first coil with a first operating current and a second coil with a second operating current. The first coil and the second coil are coupled in series with the rechargeable battery and configured to charge the rechargeable battery to reach a rated value of the terminal voltage. The second relay switch further comprises a first pair of input electrical terminals denoted as "L" and "N" and configured to couple to the line voltage from the AC mains, a second pair of input electrical terminals denoted as "AA" and configured to couple to a first supplied voltage, $V_1$, and a third pair of input electrical terminals denoted as "EE" and configured to receive a first pick-up voltage to operate the second coil. The second relay switch further comprises a pair of output electrical terminals denoted as "CC" configured to relay either the line voltage from the AC mains or the first supplied voltage, $V_1$, to the external power supply unit to operate thereon. In this case, the relay switch comprises a double-pole double-throw (DPDT) configuration, in which either the line voltage from the AC mains or the first supplied voltage, $V_1$, can be coupled to the external power supply unit to respectively operate thereon without crosstalk. The first supplied voltage, $V_1$, is provided by the LED driving circuit operated by the rechargeable battery. Although the first supplied voltage, $V_1$, is within an input operating voltage range of the external power supply unit and can operate thereof, the LED driving circuit may provide less power to the external power supply unit to save battery energy so as to sustain at least 90 minutes according to city codes. In other words, the LED driving circuit provides a fraction of power the external power supply unit consumes when the line voltage from the AC mains is available. The third pair of input electrical terminals are configured to receive the first pick-up voltage to operate the second coil.

The first relay switch further comprises a first input electrical terminal, a second input electrical terminal, connected to "B+", a fourth pair of input electrical terminals, and an output electrical terminal configured to relay either the terminal voltage (i.e. "B+") or a voltage of the ground reference to an input of the LED driving circuit in a way to enable or disable the LED driving circuit according to either availability of the AC mains or whether the recharge battery test is performed. The fourth pair of input electrical terminals are configured to receive a second pick-up voltage to operate the first coil. Either the third pair of input electrical terminals or the fourth pair of input electrical terminals are coupled to the first DC voltage, $V_{D1}$, at "E" and the terminal voltage at "E". When the first DC voltage, $V_{D1}$, is greater than a sum of the terminal voltage and either the first pick-up voltage or the second pick-up voltage, both the first coil and the second coil operate to allow the first operating current and the second operating current combined to charge the rechargeable battery. The reason why the two relay switches are used is relay switches are reliable and must be used in emergency lighting and power equipment according to a UL standard, UL 924, emergency lighting and power equipment. Such equipment is intended to automatically supply illumination or power or both to critical areas and equipment in an event of failure of the normal supply or in the event of accident to elements of a system essential to safety of human life. The two relay switches used are served as charging elements and meet regulatory requirements.

The full-wave rectifier assembly comprises a full-wave rectifier and at least one capacitor coupled between the two electrical conductors and the full-wave rectifier. The at least one capacitor is configured to reduce the line voltage from the AC mains to a relatively low AC voltage in a way that the full-wave rectifier can convert the relatively low AC voltage into the first DC voltage, $V_{D1}$, no extra electronic driver needed. The charging and discharging control circuit further comprises a test switch configured to initiate a rechargeable battery test. Please note that the rechargeable battery test is configured to investigate a condition of the rechargeable battery to see if the rated value of the terminal voltage is available at all times to operate the LED driving circuit in an event of power failure. The test switch is coupled in parallel with the first coil and the second coil in a way that the test switch, the first coil, and the second coil all receive a voltage from "EE". When the test switch is pressed during the rechargeable battery test, both the first coil and the second coil are disabled, resulting in a connection between the high voltage, $V_1$, and the pair of output electrical terminals "CC". When the test switch is pressed during the rechargeable battery test, the first relay switch is disabled to relay the terminal voltage to the primary winding via the input inductor and to power up the transformer. The charging and discharging control circuit further comprises at least one pair of electrical contacts coupled between the rechargeable battery and both the first coil and the second coil and configured to either connect the rechargeable battery for charging and discharging purposes or disconnect the rechargeable battery to prevent battery energy from being drained when the emergency lighting and power system is not in use. The at least one pair of electrical contacts comprise electrical contacts in a switch, a relay, and a jumper, or electrical terminals configured to accommodate for jumper wires.

The LED driving circuit comprises a transformer and is configured to receive the terminal voltage and to convert the terminal voltage into a first supplied voltage, $V_1$, either when a line voltage from the AC mains is unavailable or when the rechargeable battery test is performed. The LED driving circuit comprises a transformer having a primary side and a secondary side. The primary side comprises a primary winding whereas the secondary side comprises a secondary winding and an auxiliary winding. The LED driving circuit is configured to receive the terminal voltage, B+ from the rechargeable battery and to convert the terminal voltage into the first supplied voltage, $V_1$, and the second DC voltage, $V_{D2}$, when the line voltage from the AC mains is unavailable. The first supplied voltage, $V_1$, is compatible to a voltage in an input operating voltage range of the power supply unit whereas the second DC voltage is compatible to a voltage in a range of 0-to-10 volts. The secondary side further comprises a rectifier and at least one capacitor. The rectifier and the at least one capacitor are configured to couple to the second winding and to generate the second DC voltage, $V_{D2}$, when the line voltage from the AC mains is unavailable. The second DC voltage, $V_{D2}$, is coupled to an external power supply unit via a pair of dimming input ports denoted as "DD" and configured to control the external power supply unit in an external luminaire to operate with a fraction of power consumed when the line voltage from the AC mains is available, whereas a combination of the second DC voltage, $V_{D2}$, and the first supplied voltage, $V_1$, is configured to maintain stability of the external power supply unit in a way that external one or more LED arrays connected to the external power supply unit are operated without strobing. The primary side further comprises a first electronic switch, a second electronic switch, and an input inductor coupled to a center-tap of the primary winding. Both the first electronic switch and the second electronic switch control charging and discharging of the primary winding. The secondary winding is coupled to the second pair of input electrical terminals "AA" of the second relay switch, providing the first supplied voltage to an external LED luminaire to operate thereof either when the line voltage from the AC mains is unavailable or when a recharge battery test is performed.

The LED driving circuit further comprises a control winding coupled to the first electronic switch and the second electronic switch and configured to control on and off thereof and to create power pulses sustaining operations of the transformer. The LED driving circuit further comprises a resistor coupled to a center-tap of the control winding and configured to feed the terminal voltage to the control winding, creating bias voltages to operate the first electronic switch and the second electronic switch in alternate cycles, thus providing switching needed for actions of the transformer. In other words, an upper portion of the primary winding is driven in one direction of a current flow with the first electronic switch activated, whereas a lower portion of the primary winding is driven in the opposite direction of the current flow with the second electronic switch activated. Each of the first electronic switch and the second electronic switch comprises a metal-oxide-semiconductor field-effect transistor (MOSFET) or a bipolar junction transistor (BJT).

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified. Moreover, in the section of detailed description of the invention, any of a first, a second, a third, and so forth does not necessarily represent a part that is mentioned in an ordinal manner, but a particular one.

DETAILED DESCRIPTION OF THE INVENTION

Figure 1:
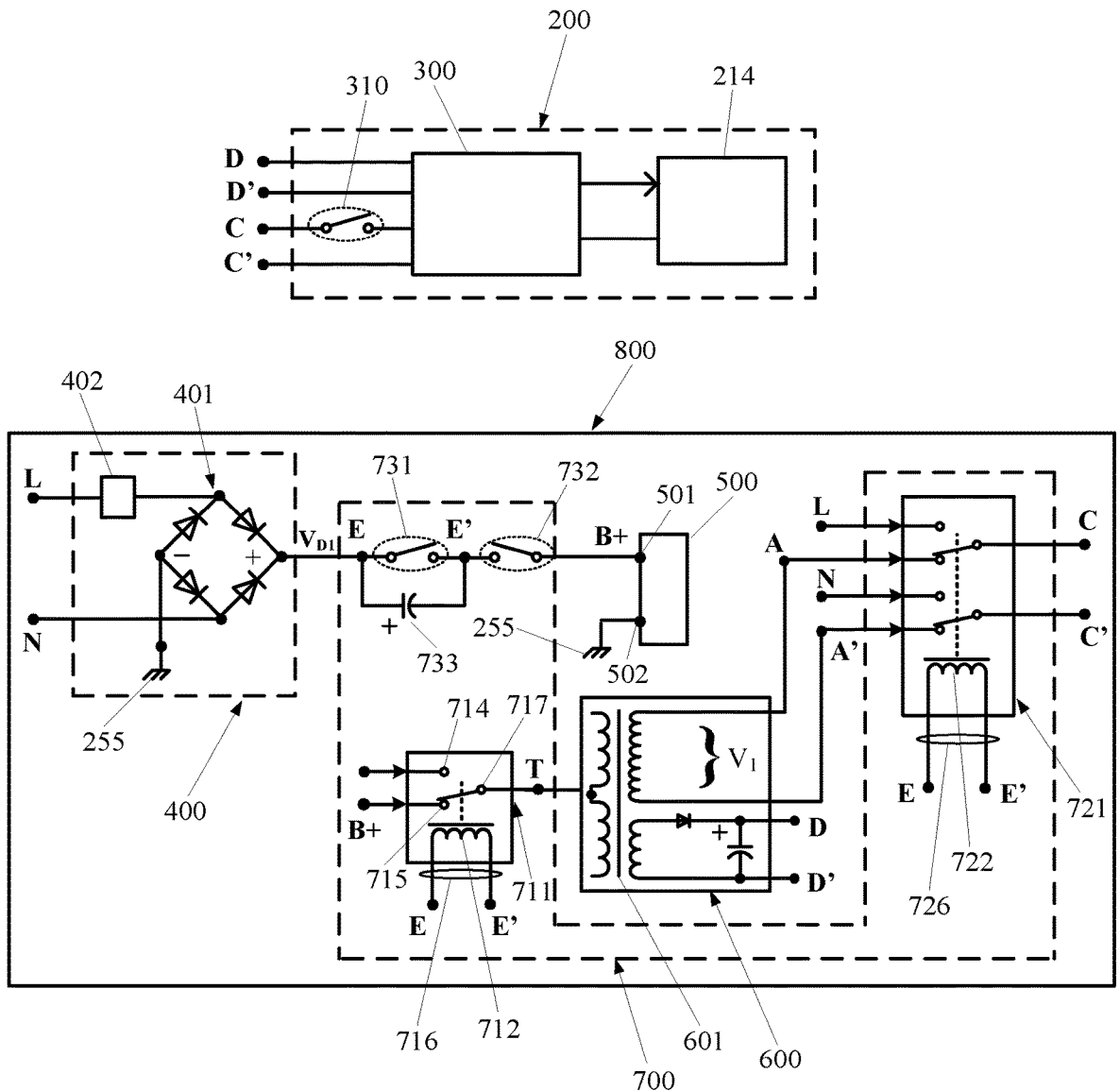
FIG. 1 is a block diagram of an emergency lighting and power system according to the present disclosure.

FIG. 1 is a block diagram of an emergency lighting and power system according to the present disclosure. An emergency lighting and power system 800 comprises a rechargeable battery 500, two electrical conductors, a full-wave rectifier assembly 400, an LED driving circuit 600, and a charging and discharging control circuit 700. The rechargeable battery 500 comprises a positive potential terminal 501 and a negative potential terminal 502 with a terminal voltage across thereof. A voltage at the positive potential terminal 501 is denoted as B+ with respect to the negative potential terminal 502, which connects to a ground reference 255. In FIG. 1, the two electrical conductors are coupled to an un-switched alternate-current (AC) mains denoted as "L" and "N". The full-wave rectifier assembly 400 comprises a full-wave rectifier 401 and at least one capacitor 402 coupled between "L" of the AC mains and the full-wave rectifier 401 and configured to reduce a line voltage appeared at "L" into a relatively low AC voltage in a way that the full-wave rectifier 401 can convert the relatively low AC voltage into a first DC voltage, no extra electronic driver needed. The first DC voltage $V_{D1}$, is with respect to the ground reference 255. The charging and discharging control circuit 700 comprises a first relay switch 711 and a second relay switch 721. The first relay switch 711 and the second relay switch 721 respectively comprise a first coil 712 with a first operating current and a second coil 722 with a second operating current. The first coil 712 and the second coil 722 are coupled in series with the rechargeable battery 500 and configured to charge the rechargeable battery 500 to reach a rated value of the terminal voltage. The second relay switch 721 further comprises a first pair of input electrical terminals denoted as "L" and "N" and configured to couple to the line voltage from the AC mains, a second pair of input electrical terminals denoted as "AA" and configured to couple to the first supplied voltage, $V_1$, with a predetermined power and a third pair of input electrical terminals denoted as "EE" and configured to receive a first pick-up voltage to operate the second coil 722. The second relay switch 721 further comprises a pair of output electrical terminals denoted as "CC" configured to relay either the line voltage from the AC mains or the first supplied voltage, $V_1$, to an external power supply unit 300 to operate thereon. In this case, the relay switch 731 comprises a double-pole double-throw (DPDT) configuration, in which either the line voltage from the AC mains or the first supplied voltage, $V_1$, can be coupled to the external power supply unit 300 to respectively operate thereon without crosstalk. The first supplied voltage, $V_1$, is provided by the LED driving circuit 600 operated by the rechargeable battery 500. Although the first supplied voltage, $V_1$, is within an input operating voltage range of the external power supply unit 300 and can operate thereof, the LED driving circuit 600 may provide less power (i.e. the predetermined power) to the external power supply unit 300 to save battery energy so as to sustain at least 90 minutes according to city codes. In other words, the LED driving circuit 600 provides a fraction of power the external power supply unit 300 consumes when the line voltage from the AC mains is available. The third pair of input electrical terminals are configured to receive the first pick-up voltage to operate the second coil 722. The external power supply unit 300 may be coupled to the "C" via a power switch 310 configured to turn the power to the external power supply unit 300 on or off.

In FIG. 1, the first relay switch 711 further comprises a first input electrical terminal 714, a second input electrical terminal 715, connected to "B+", a fourth pair of input electrical terminals 716, and an output electrical terminal 717 configured to relay either the terminal voltage (i.e. "B+") or a voltage of the ground reference to an input of the LED driving circuit 600 in a way to enable or disable the LED driving circuit 600 according to either availability of the AC mains or whether the recharge battery test is performed. The fourth pair of input electrical terminals 716 are configured to receive a second pick-up voltage to operate the first coil 712. Either the third pair of input electrical terminals 726 or the fourth pair of input electrical terminals 716 are coupled to the first DC voltage at "E" and the terminal voltage at "E". When the first DC voltage, $V_{D1}$, is greater than a sum of the terminal voltage and either the first pick-up voltage or the second pick-up voltage, both the first coil 712 and the second coil 722 operate to allow the first operating current and the second operating current combined to charge the rechargeable battery 500. The full-wave rectifier assembly 400 comprises a full-wave rectifier and at least one capacitor coupled between the two electrical conductors and the at least one full-wave rectifier, the at least one capacitor configured to reduce the line voltage from the AC mains to a relatively low AC voltage in a way that the at least one full-wave rectifier can convert the relatively low AC voltage into the first DC voltage $V_{D1}$, no extra electronic driver needed. In FIG. 1, the LED driving circuit 600 comprises a transformer 601 and is configured to receive the terminal voltage and to convert the terminal voltage into the high voltage, $V_1$, either when a line voltage from the AC mains is unavailable or when a recharge battery test is performed.

In FIG. 1, the charging and discharging control circuit 700 further comprises a test switch 731 configured to initiate the rechargeable battery test. The test switch 731 is coupled in parallel with the first coil 712 and the second coil 722 in a way that the test switch 731, the first coil 712, and the second coil 722 all receive a voltage from "EE". When the test switch 731 is pressed during the rechargeable battery test, both the first coil 712 and the second coil 722 are disabled, resulting in a connection between the high voltage, $V_1$, and the pair of output electrical terminals "CC". When the test switch 731 is pressed during the rechargeable battery test, the first relay switch 711 is disabled to relay the terminal voltage to the primary winding 611 via the input inductor 612 and to power up the transformer 601. The charging and discharging control circuit 700 further comprises a capacitor 735 configured to smooth out charging and to protect the first coil 712 and the second coil 722. The charging and discharging control circuit 700 further comprises at least one pair of electrical contacts 732 coupled between the rechargeable battery 500 and both the first coil 712 and the second coil 722 and configured to either connect the rechargeable battery 500 for charging and discharging purposes or disconnect the rechargeable battery 500 to prevent battery energy from being drained when the emergency backup system is not in use. The at least one pair of electrical contacts 732 comprise electrical contacts in a switch, a relay, and a jumper, or electrical terminals accommodated for jumper wires.

Figure 2:
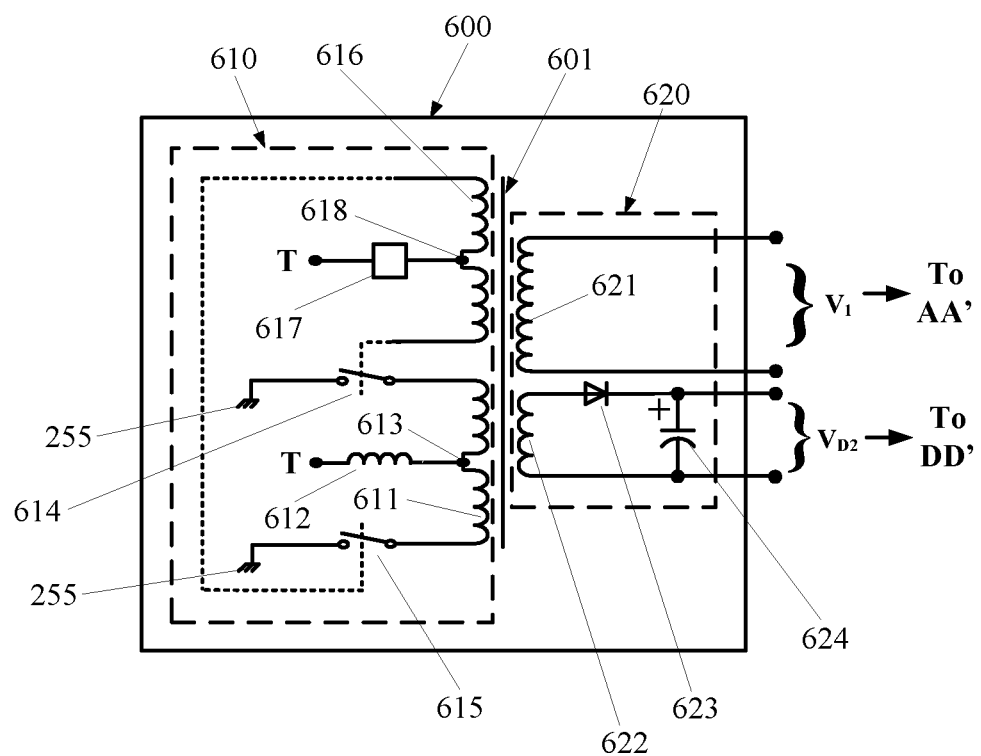
FIG. 2 is a block diagram of an LED driving circuit according to the present disclosure.

FIG. 2 is a block diagram of an LED driving circuit according to the present disclosure. Referring to FIG. 1 and FIG. 2, the LED driving circuit 600 comprises a transformer 601 having a primary side 610 and a secondary side 620. The primary side 610 comprises a primary winding 611 whereas the secondary side 620 comprises a secondary winding 621 and an auxiliary winding 622. The LED driving circuit 600 is configured to receive the terminal voltage, B+ from the rechargeable battery 500 and to convert the terminal voltage into the first supplied voltage, V1, and the low DC output voltage, $V_{D2}$, when the line voltage from the AC mains is unavailable. The first supplied voltage, $V_1$, is compatible to a voltage in an input operating voltage range of the power supply unit 300 whereas the low DC output voltage is compatible to a voltage in a range of 0-to-10 volts. The secondary side 620 further comprises a rectifier 623 and at least one capacitor 624. The rectifier 623 and the at least one capacitor 624 are configured to couple to the second winding 622 and to generate the low DC output voltage, $V_{D2}$, when the line voltage from the AC mains is unavailable. The low DC output voltage, $V_{D2}$, is coupled to an external power supply unit 300 via a pair of input ports denoted as "DD" and configured to control the external power supply unit 300 in an external luminaire 200 to operate with a fraction of power consumed when the line voltage from the AC mains is available, whereas a combination of the low DC output voltage, $V_{D2}$, and the first supplied voltage, $V_1$, is configured to maintain stability of the external power supply unit 300 in a way that external one or more LED arrays 214 connected to the external power supply unit 300 are operated without strobing. The primary side 610 further comprises a first electronic switch 614, a second electronic switch 615, and an input inductor 612 coupled to a center-tap 613 of the primary winding 611. Both the first electronic switch 614 and the second electronic switch 615 control charging and discharging of the primary winding 611. The secondary winding 621 is coupled to the second pair of input electrical terminals "AA" of the second relay switch 721, providing the first supplied voltage to an external LED luminaire 200 to operate thereof either when the line voltage from the AC mains is unavailable or when a recharge battery test is performed.

In FIG. 2, the LED driving circuit 600 further comprises a control winding 616 coupled to the first electronic switch 614 and the second electronic switch 615 and configured to control on and off thereof and to create power pulses sustaining operations of the transformer 601. The LED driving circuit 600 further comprises a resistor 617 coupled to a center-tap 618 of the control winding 616 and configured to feed the terminal voltage to the control winding 616, creating bias voltages to operate the first electronic switch 614 and the second electronic switch 615 in alternate cycles, thus providing switching needed for actions of the transformer 601. In other words, an upper portion of the primary winding 611 is driven in one direction of a current flow with the first electronic switch 614 activated, whereas a lower portion of the primary winding 611 is driven in the opposite direction of the current flow with the second electronic switch 615 activated. Each of the first electronic switch 614 and the second electronic switch 615 comprises a metal-oxide-semiconductor field-effect transistor (MOSFET) or a bipolar junction transistor (BJT). The LED driving circuit 600 operated with the first electronic switch 614 and the second electronic switch 615 enabled in alternate cycles has several advantages such as simplicity, efficiency, low emissions, easier transformer choice and smaller transformers, and better immunity.

Figure 3:
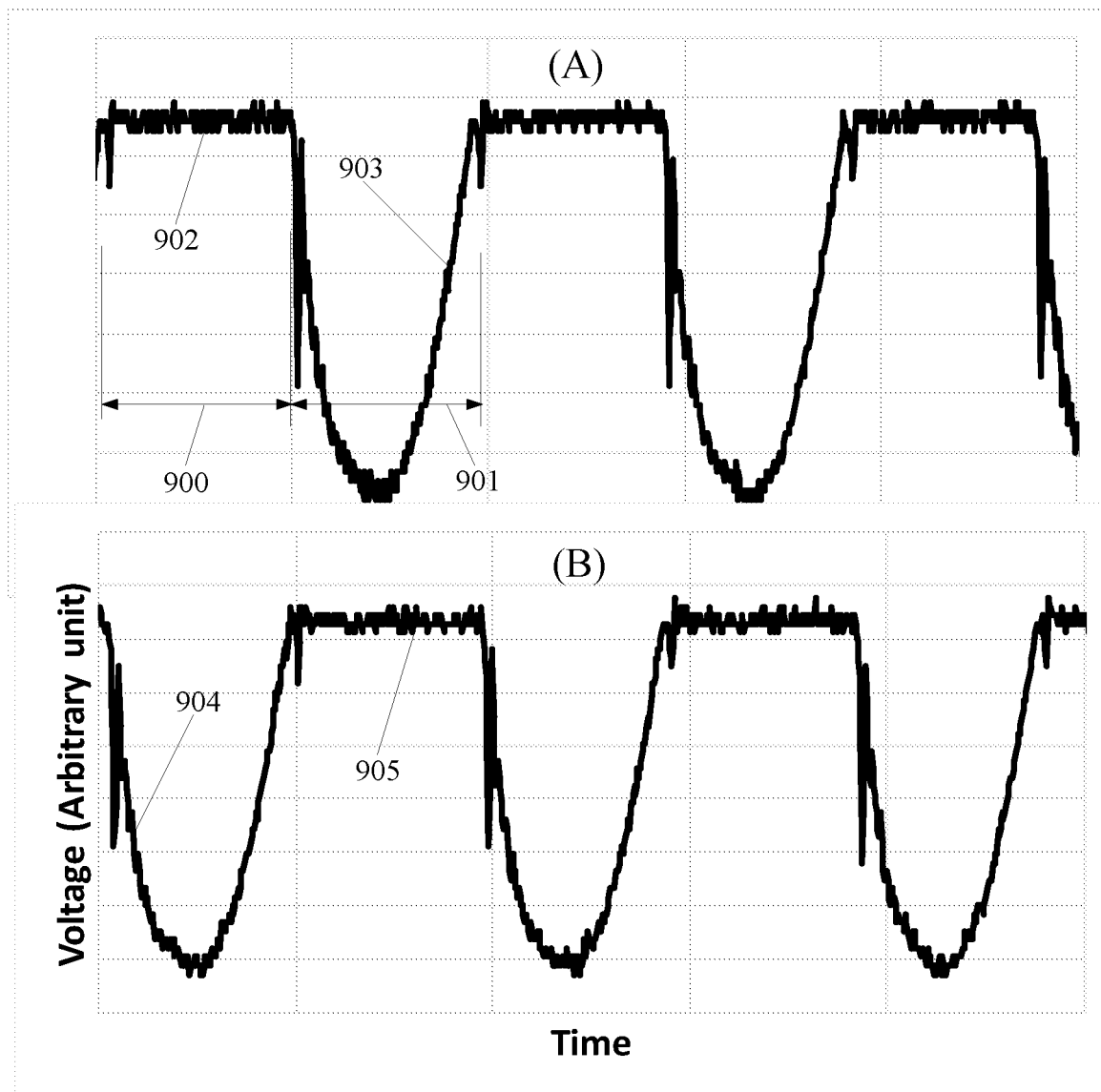
FIG. 3 is control signal waveforms to drive the LED driving circuit according to the present disclosure.

FIG. 3 is control voltage waveforms to drive the LED driving circuit according to the present disclosure. In FIG. 3 (A), a first control voltage waveform comprises a first cycle 900 and a second cycle 901, respectively comprising a flat-top waveform and a valley-shape waveform. The first control voltage waveform is configured to drive the first electronic switch 614 (FIG. 2) to turn on and off. In FIG. 3 (B), a second control voltage waveform comprises the same cycles as the first cycle 900 and the second cycle 901, respectively comprising the valley-shape waveform and the flat-top waveform. As shown, the second control voltage waveform is 180 degrees out-of-phase of the first control voltage waveform and configured to drive the second electronic switch 615 to turn on and off. In other words, the first control voltage waveform and the second control voltage waveform create the bias voltages to operate the first electronic switch 614 and the second electronic switch 615 in alternate cycles, thus providing switching needed for actions of the transformer. The LED driving circuit 600 uses transformer actions to transfer power from the primary side 610 to the secondary side 620 (FIG. 2), as opposed to other topologies, which store energy in an inductor in a first phase of switching cycles and transfer the energy to a load in a second phase.

Figure 4:
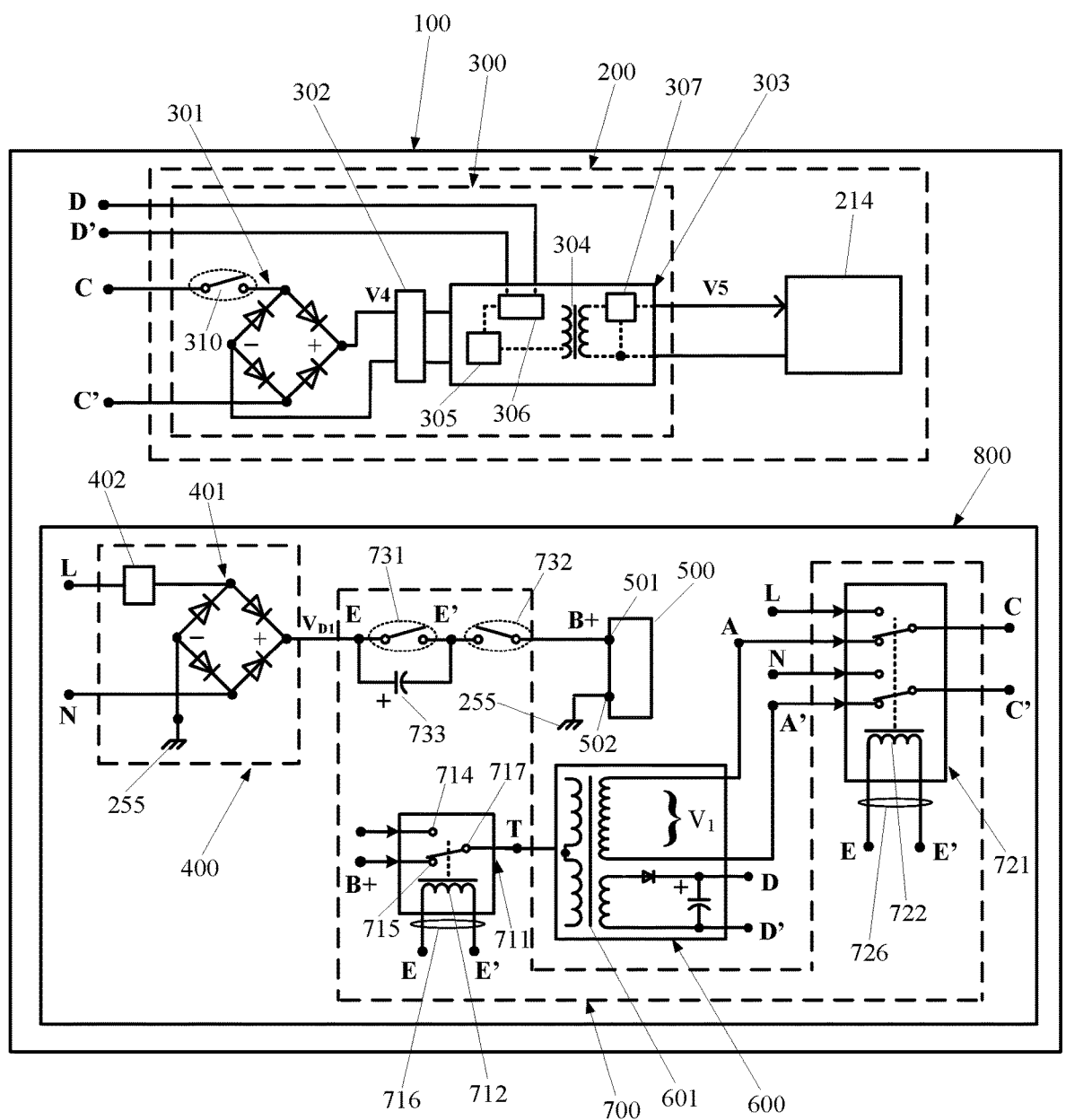
FIG. 4 is a block diagram of an LED lighting system with an emergency lighting and power system according to the present disclosure.

FIG. 4 is a block diagram of an LED lighting system with an emergency lighting and power system according to the present disclosure. In FIG. 4, the LED lighting system 100 comprises a luminaire 200 and an emergency lighting and power system 800. The emergency lighting and power system 800 is basically the same as depicted in FIG. 1. The luminaire 200 comprises one or more LED arrays 214 with a forward voltage across thereon and the power supply unit 300 originally designed to receive the line voltage from the AC mains at ports denoted as "CC'" for high-power lighting applications. When the line voltage from the AC mains is inputted, the power supply unit 300 generates a fifth DC voltage and a rated current to normally operate the one or more LED arrays 214. The power supply unit 300 may be coupled to the "C" via a power switch 310 configured to turn the power to the power supply unit 300 on or off. However, the emergency lighting and power system 800 provide a power to the luminaire 200. When the line voltage from the AC mains is unavailable, the emergency lighting and power system 800 is automatically started to provide the first supplied voltage, $V_1$, to the luminaire 200 with a fraction of rated power. The power supply unit 300, originally designed at a full current, is unable to provide such a full current to drive the one or more LED arrays 214. In this case, a phenomenon of strobing on the luminaire 200 may occur.

In FIG. 4, the emergency lighting and power system 800 comprises a rechargeable battery 500, two un-switched electrical conductors, a full-wave rectifier assembly 400, an LED driving circuit 600, and a charging and discharging control circuit 700. The rechargeable battery 500 comprises a positive potential terminal 501 and a negative potential terminal 502 with a terminal voltage across thereof. A voltage at the positive potential terminal 501 is denoted as B+ with respect to the negative potential terminal 502, which connects to a ground reference 255. In FIG. 4, the two un-switched electrical conductors are coupled to an un-switched AC mains denoted as "L" and "N". The full-wave rectifier assembly 400 comprises a full-wave rectifier 401 and at least one capacitor 402 coupled between "L" of the AC mains and the full-wave rectifier 401 and configured to reduce a line voltage appeared at "L" into a relatively low AC voltage. The full-wave rectifier 401 is configured to convert the relatively low AC voltage into a first DC voltage, without using an extra DC-to-DC converter. Therefore, no extra electronic driver is needed in this case. The first DC voltage, $V_{D1}$, is with respect to the ground reference 255. The charging and discharging control circuit 700 comprises a first relay switch 711 and a second relay switch 721. The first relay switch 711 and the second relay switch 721 respectively comprise a first coil 712 with a first operating current and a second coil 722 with a second operating current. Each of the first coil 712 and the second coil 722 is coupled in series with the rechargeable battery 500 and configured provide a charging current path to charge the rechargeable battery 500 to reach a rated value of the terminal voltage. The second relay switch 721 further comprises a first pair of input electrical terminals denoted as "L" and "N" and configured to couple to the line voltage from the AC mains, a second pair of input electrical terminals denoted as "AA" and configured to couple to the first supplied voltage, $V_1$, and a third pair of input electrical terminals denoted as "EE" and configured to receive the first pick-up voltage to operate the second coil 722. The second relay switch 721 further comprises a pair of output electrical terminals denoted as "CC" configured to relay either the line voltage from the AC mains or the first supplied voltage, $V_1$, to the external power supply unit 300 to operate thereon. In this case, the relay switch 731 comprises a double-pole double-throw (DPDT) configuration, in which either the line voltage from the AC mains or the first supplied voltage, $V_1$, can be coupled to the external power supply unit 300 to respectively operate thereon without crosstalk. The first supplied voltage, $V_1$, is provided by the LED driving circuit 600 operated by the rechargeable battery 500. Although the first supplied voltage, $V_1$, is within an input operating voltage range of the external power supply unit 300 and can operate thereof, the LED driving circuit 600 may provide less power to the external power supply unit 300 to save battery energy so as to sustain at least 90 minutes according to city codes. In other words, the LED driving circuit 600 provides a fraction of power the external power supply unit 300 consumes when the line voltage from the AC mains is available. The third pair of input electrical terminals are configured to receive the first pick-up voltage to operate the second coil 722.

In FIG. 4, the first relay switch 711 further comprises a first input electrical terminal 714, a second input electrical terminal 715, connected to "B+", a fourth pair of input electrical terminals 716, and an output electrical terminal 717 configured to relay either the terminal voltage (i.e. "B+") or a voltage of the ground reference to an input of the LED driving circuit 600 in a way to enable or disable the LED driving circuit 600 according to either availability of the AC mains or whether the recharge battery test is performed. Either the third pair of input electrical terminals 726 or the fourth pair of input electrical terminals 716 are coupled to the first DC voltage at "E" and the terminal voltage at "E". When the first DC voltage, $V_{D1}$, is greater than a sum of the terminal voltage and either the first pick-up voltage or the second pick-up voltage, both the first coil 712 and the second coil 722 operate to allow the first operating current and the second operating current combined to charge the rechargeable battery 500. The full-wave rectifier assembly 400 comprises a full-wave rectifier 401 and at least one capacitor 402 coupled between the two un-switched electrical conductors denoted as "L" and "N" and the full-wave rectifier 401. The at least one capacitor 402 is configured to reduce the line voltage from the AC mains to a relatively low AC voltage. The full-wave rectifier 401 is configured to convert the relatively low AC voltage into the first DC voltage, $V_{D1}$, without using an extra DC-to-DC converter. Therefore, no extra electronic driver is needed in this case. In FIG. 4, the LED driving circuit 600 comprises a transformer 601 and is configured to receive the terminal voltage and to convert the terminal voltage into the first supplied voltage, $V_1$, either when a line voltage from the AC mains is unavailable or when a recharge battery test is performed.

In FIG. 4, the charging and discharging control circuit 700 further comprises a test switch 731 configured to initiate the rechargeable battery test. The test switch 731 is coupled in parallel with the first coil 712 and the second coil 722 in a way that the test switch 731, the first coil 712, and the second coil 722 all receive a voltage from "EE". When the test switch 731 is pressed during the rechargeable battery test, both the first coil 712 and the second coil 722 are disabled, resulting in a connection between the high voltage, $V_1$, and the pair of output electrical terminals "CC". When the test switch 731 is pressed during the rechargeable battery test, the first relay switch 711 is disabled to relay the terminal voltage to the primary winding 611 via the input inductor 612 and to power up the transformer 601. The charging and discharging control circuit 700 further comprises at least one pair of electrical contacts 732 coupled between the rechargeable battery 500 and both the first coil 712 and the second coil 722 and configured to either connect the rechargeable battery 500 for charging and discharging purposes or disconnect the rechargeable battery 500 to prevent battery energy from being drained when the emergency lighting and power system 800 is not in use. The at least one pair of electrical contacts 732 comprise electrical contacts in a switch, a relay, and a jumper, or electrical terminals accommodated for jumper wires.

In FIG. 4, the LED driving circuit 600 comprises a transformer 601 having a primary side 610 and a secondary side 620, as depicted in FIG. 2. The primary side 610 comprises a primary winding 611 whereas the secondary side 620 comprises a secondary winding 621 and an auxiliary winding 622. The LED driving circuit 600 is configured to receive the terminal voltage, B+ from the rechargeable battery 500 and to convert the terminal voltage into the first supplied voltage, V1, and the low DC output voltage, $V_{D2}$, when the line voltage from the AC mains is unavailable. The first supplied voltage, $V_1$, is compatible to a voltage in an input operating voltage range of the power supply unit 300 whereas the low DC output voltage is compatible to a voltage in a range of 0-to-10 volts. The secondary side 620 further comprises a rectifier 623 and at least one capacitor 624. The rectifier 623 and the at least one capacitor 624 are configured to couple to the second winding 622 and to generate the low DC output voltage, $V_{D2}$, when the line voltage from the AC mains is unavailable. The low DC output voltage, $V_{D2}$, is coupled to an external power supply unit 300 via a pair of input ports denoted as "DD" and configured to control the external power supply unit 300 in an external luminaire 200 to operate with a fraction of power consumed when the line voltage from the AC mains is available, whereas a combination of the low DC output voltage, $V_{D2}$, and the first supplied voltage, $V_1$, is configured to maintain stability of the external power supply unit 300 in a way that external one or more LED arrays 214 connected to the external power supply unit 300 are operated without strobing. The primary side 610 further comprises a first electronic switch 614, a second electronic switch 615, and an input inductor 612 coupled to a center-tap 613 of the primary winding 611. Both the first electronic switch 614 and the second electronic switch 615 control charging and discharging of the primary winding 611. The secondary winding 621 is coupled to the second pair of input electrical terminals "AA" of the second relay switch 721, providing the first supplied voltage to an external LED luminaire 200 to operate thereof either when the line voltage from the AC mains is unavailable or when a recharge battery test is performed.

In FIG. 4, the LED driving circuit 600 further comprises a control winding 616 coupled to the first electronic switch 614 and the second electronic switch 615 and configured to control on and off thereof and to create power pulses sustaining operations of the transformer 601. The LED driving circuit 600 further comprises a resistor 617 coupled to a center-tap 618 of the control winding 616 and configured to feed the terminal voltage to the control winding 616, creating bias voltages to operate the first electronic switch 614 and the second electronic switch 615 in alternate cycles, thus providing switching needed for actions of the transformer 601. In other words, an upper portion of the primary winding 611 is driven in one direction of a current flow with the first electronic switch 614 activated, whereas a lower portion of the primary winding 611 is driven in the opposite direction of the current flow with the second electronic switch 615 activated. Each of the first electronic switch 614 and the second electronic switch 615 comprises an MOSFET or a BJT.

In FIG. 4, the power supply unit 300 comprises two main electrical conductors denoted as "C" and "C", a main full-wave rectifier 301, and an input filter 302. The two main electrical conductors "C" and "C" are configured to couple to "CC" ports in the emergency lighting and power system 800 and to convert either the line voltage from the AC mains or the first supplied voltage, $V_1$, into a fourth DC voltage, $V_4$. The main full-wave rectifier 301 is coupled to the two main electrical conductors "C" and "C" via a power switch 310 to turn the power supply unit 300 on and off. The input filter 302 is configured to suppress electromagnetic interference (EMI) noises. The power supply unit 300 further comprises a power switching converter 303 comprising a main transformer 304 and a power factor correction (PFC) and power switching circuit 305. The PFC and power switching circuit 305 is coupled to the main full-wave rectifier 301 via the input filter 302 and configured to improve a power factor, to reduce voltage ripples, and to convert the fourth DC voltage into a fifth DC voltage. The fifth DC voltage is configured to couple to the one or more LED arrays 214 to operate thereon. The power switching converter 303 further comprises a pulse width modulation (PWM) control circuit 306 and a pair of dimming input ports denoted as "DD" configured to receive a 0-to-10 V signal, a 1-to-10 V signal, a PWM signal, or a signal from a variable resistor for luminaire dimming applications. The pair of dimming input ports "DD" are coupled to the LED driving circuit 600 to receive the second DC voltage, $V_{D2}$. The PFC and power switching circuit 305 is basically a current source, in which when the one or more LED arrays require more current than a predetermined maximum, the fifth DC voltage drops accordingly to maintain power conservation. Although being directly coupled to the secondary winding 621 without rectifiers and filters, the first supplied voltage, $V_1$, may be a DC voltage via the rectifiers and the filters coupled to the secondary winding 621. If this is the case, the main full-wave rectifier 301 in FIG. 4 can still pass such a DC voltage to the power switching converter 303 to work.

Whereas preferred embodiments of the present disclosure have been shown and described, it will be realized that alterations, modifications, and improvements may be made thereto without departing from the scope of the following claims. Another kind of schemes with an emergency lighting and power system adopted in an LED lighting system to operate a luminaire using various kinds of combinations to accomplish the same or different objectives could be easily adapted for use from the present disclosure. Accordingly, the foregoing descriptions and attached drawings are by way of example only and are not intended to be limiting.

What is claimed is:

1. An emergency lighting and power system, comprising:
   two electrical conductors configured to couple to alternate-current (AC) mains;
   a rechargeable battery comprising a positive potential terminal and a negative potential terminal with a terminal voltage across thereof;
   a full-wave rectifier assembly coupled to the two electrical conductors and configured to convert a line voltage from the AC mains into a first direct-current (DC) voltage with respect to a ground reference;
   a light-emitting diode (LED) driving circuit comprising a transformer, the LED driving circuit configured to receive the terminal voltage and to convert the terminal voltage into a first supplied voltage with a predetermined power either when the line voltage from the AC mains is unavailable or when a recharge battery test is performed; and
   a charging and discharging control circuit comprising a first relay switch and a second relay switch, wherein the first relay switch and the second relay switch respectively comprise a first coil with a first operating current and a second coil with a second operating current, and wherein each of the first coil and the second coil is coupled in series with the rechargeable battery and configured to provide a charging current path to charge the rechargeable battery to reach a rated value of the terminal voltage,
   wherein:
      the second relay switch further comprises a first pair of input electrical terminals, a second pair of input electrical terminals, and a third pair of input electrical terminals, wherein the third pair of input electrical terminals are configured to receive a first pick-up voltage to operate the second coil;
      the second relay switch further comprises a pair of output electrical terminals configured to relay either the line voltage from the AC mains appeared at the first pair of input electrical terminals or the first supplied voltage appeared at the second pair of input electrical terminals to the pair of output electrical terminals; and
      the rechargeable battery test is configured to investigate a condition of the rechargeable battery to see if the rated value of the terminal voltage is available at all times to operate the LED driving circuit in an event of power failure.

2. The emergency lighting and power system of claim 1, wherein the first relay switch further comprises a first input electrical terminal, a second input electrical terminal, a fourth pair of input electrical terminals, and an output electrical terminal, wherein the fourth pair of input electrical terminals are configured to receive a second pick-up voltage to operate the first coil, and wherein the output electrical terminal is configured to relay the terminal voltage to the LED driving circuit and to operate thereof.

3. The emergency lighting and power system of claim 2, wherein both the third pair of input electrical terminals and the fourth pair of input electrical terminals are coupled between the full-wave rectifier assembly and the rechargeable battery, and wherein, when the first DC voltage is greater than a sum of the terminal voltage and either the first pick-up voltage or the second pick-up voltage, both the first coil and the second coil operate to allow the first operating current and the second operating current combined to charge the rechargeable battery.

4. The emergency lighting and power system of claim 1, wherein the full-wave rectifier assembly comprises a full-wave rectifier and at least one capacitor coupled between the two electrical conductors and the full-wave rectifier, wherein the at least one capacitor is configured to reduce the line voltage from the AC mains to a relatively low AC voltage, and wherein the full-wave rectifier is configured to convert the relatively low AC voltage into the first DC voltage without using an extra DC-to-DC converter.

5. The emergency lighting and power system of claim 1, wherein the LED driving circuit further comprises a first electronic switch, a second electronic switch, and an input inductor coupled to the transformer, wherein the transformer comprises a primary winding and a secondary winding, wherein both the first electronic switch and the second electronic switch control charging and discharging of the primary winding, and wherein the secondary winding is coupled to the second pair of input electrical terminals of the second relay switch, providing the first supplied voltage with a predetermined power to operate an external luminaire either when the line voltage from the AC mains is unavailable or when the recharge battery test is performed.

6. The emergency lighting and power system of claim 5, wherein the LED driving circuit further comprises an auxiliary winding and a diode rectifier coupled to the auxiliary winding, wherein the diode rectifier is configured to convert an AC voltage from the auxiliary winding into a second DC voltage, and wherein the second DC voltage is coupled to dimming input ports in the external luminaire to control power consumption thereof with a fraction of a rated full power and to maintain stability of the external luminaire without strobing.

7. The emergency lighting and power system of claim 5, wherein the LED driving circuit further comprises a control winding coupled to the first electronic switch and the second electronic switch and configured to control on and off thereof and to create power pulses sustaining operations of the transformer.

8. The emergency lighting and power system of claim 7, wherein the LED driving circuit further comprises a resistor coupled to a center-tap of the control winding and configured to feed the terminal voltage to the control winding creating bias voltages to operate the first electronic switch and the second electronic switch in alternate cycles, thus providing switching in operation of the transformer.

9. The emergency lighting and power system of claim 5, wherein each of the first electronic switch and the second electronic switch comprises either a metal-oxide semiconductor field-effect transistor (MOSFET) or a bipolar junction transistor (BJT).

10. The emergency lighting and power system of claim 5, wherein the charging and discharging control circuit further comprises a test switch coupled in parallel with the first coil and the second coil and configured to initiate the rechargeable battery test, wherein, when the test switch is pressed during the rechargeable battery test, both the first coil and the second coil are disabled, and wherein the first relay switch is configured to relay the terminal voltage to the primary winding and to operate the transformer.

11. The emergency lighting and power system of claim 1, wherein the charging and discharging control circuit further comprises at least one pair of electrical contacts coupled between the rechargeable battery and both the first coil and the second coil and configured to connect to the rechargeable battery to charge and discharge thereof.

12. The emergency lighting and power system of claim 11, wherein the at least one pair of electrical contacts comprise electrical contacts in a switch, a relay, and a jumper, or electrical terminals configured to accommodate jumper wires.

13. A light-emitting diode (LED) lighting system, comprising:
   a luminaire, comprising:
      one or more LED arrays with a forward voltage; and
      a power supply unit, comprising:
         two main electrical conductors;
         a main full-wave rectifier coupled to the at least two electrical conductors, the main full-wave rectifier configured to convert a voltage inputted from the at least two electrical conductors into a fourth direct-current (DC) voltage;
         a power switching converter comprising a main transformer and a power factor correction (PFC) and power switching circuit, wherein the PFC and power switching circuit is coupled to the main full-wave rectifier via the input filter and configured to improve a power factor, to reduce voltage ripples, and to convert the fourth DC voltage into a fifth DC voltage, wherein the fifth DC voltage is configured to couple to the one or more LED arrays to operate thereon, and wherein the power switching converter further comprises a pulse width modulation (PWM) control circuit and a pair of dimming input ports configured to receive a 0-to-10 V (volts) signal, a 1-to-10 V signal, a PWM signal, or a signal from a variable resistor used in luminaire dimming applications; and
   an emergency lighting and power system, comprising:
      two un-switched electrical conductors configured to couple to alternate-current (AC) mains;
      a rechargeable battery comprising a positive potential terminal and a negative potential terminal with a terminal voltage across thereof;
      a full-wave rectifier assembly coupled to the two electrical conductors and configured to convert a line voltage from the AC mains into a first DC voltage with respect to a ground reference;
      an LED driving circuit comprising a transformer, the LED driving circuit configured to receive the terminal voltage and to convert the terminal voltage into a first supplied voltage either when the line voltage from the AC mains is unavailable or when a recharge battery test is performed; and
      a charging and discharging control circuit comprising a first relay switch and a second relay switch, wherein the first relay switch and the second relay switch respectively comprise a first coil with a first operating current and a second coil with a second operating current, and wherein each of the first coil and the second coil is coupled in series with the rechargeable battery and configured to provide a charging current path to charge the rechargeable battery to reach a rated value of the terminal voltage,
   wherein:
      the second relay switch further comprises a first pair of input electrical terminals, a second pair of input electrical terminals, and a third pair of input electrical terminals, wherein the third pair of input electrical terminals are configured to receive a first pick-up voltage to operate the second coil;
      the second relay switch further comprises a pair of output electrical terminals configured to relay either the line voltage from the AC mains appeared at the first pair of input electrical terminals or the first supplied voltage appeared at the second pair of input electrical terminals to the pair of output electrical terminals; and
      the rechargeable battery test is configured to investigate a condition of the rechargeable battery to see if the rated value of the terminal voltage is available at all times to operate the LED driving circuit in an event of power failure.

14. The LED lighting system of claim 13, wherein the first relay switch further comprises a first input electrical terminal, a second input electrical terminal, a fourth pair of input electrical terminals, and an output electrical terminal, wherein the fourth pair of input electrical terminals is configured to receive a second pick-up voltage to operate the first coil, and wherein the output electrical terminal is configured to relay the terminal voltage to the LED driving circuit and to operate thereof.

15. The LED lighting system of claim 14, wherein both the third pair of input electrical terminals and the fourth pair of input electrical terminals are coupled between the full-wave rectifier assembly and the rechargeable battery, and wherein, when the first DC voltage is greater than a sum of the terminal voltage and either the first pick-up voltage or the second pick-up voltage, both the first coil and the second coil operate to allow the first operating current and the second operating current combined to charge the rechargeable battery.

16. The LED lighting system of claim 13, wherein the full-wave rectifier assembly comprises a full-wave rectifier and at least one capacitor coupled between the two electrical conductors and the full-wave rectifier, wherein the at least one capacitor is configured to reduce the line voltage from the AC mains to a relatively low AC voltage, and wherein the full-wave rectifier is configured to convert the relatively low AC voltage into the first DC voltage without using an extra DC-to-DC converter.

17. The LED lighting system of claim 13, wherein the LED driving circuit further comprises a first electronic switch, a second electronic switch, and an input inductor coupled to the transformer, wherein the transformer comprises a primary winding and a secondary winding, wherein both the first electronic switch and the second electronic switch control charging and discharging of the primary winding, and wherein the secondary winding is coupled to the second pair of input electrical terminals of the second relay switch, providing the first supplied voltage to the luminaire to operate thereof either when the line voltage from the AC mains is unavailable or when a recharge battery test is performed.

18. The LED lighting system of claim 17, wherein the LED driving circuit further comprises an auxiliary winding and a diode rectifier coupled to the auxiliary winding, wherein the diode rectifier is configured to convert an AC voltage from the auxiliary winding into a second DC voltage, and wherein the second DC voltage is coupled to the pair of dimming input ports to control power consumption thereof with a fraction of a rated full power and to maintain stability of the luminaire without strobing.

19. The LED lighting system of claim 17, wherein the LED driving circuit further comprises a control winding coupled to the first electronic switch and the second electronic switch and configured to control on and off thereof and to create power pulses sustaining operations of the transformer.

20. The LED lighting system of claim 19, wherein the LED driving circuit further comprises a resistor coupled to a center-tap of the control winding and configured to feed the terminal voltage to the control winding creating bias voltages to operate the first electronic switch and the second electronic switch in alternate cycles, thus providing switching in operation of the transformer.

21. The LED lighting system of claim 17, wherein the charging and discharging control circuit further comprises a test switch coupled in parallel with the first coil and the second coil and configured to initiate the rechargeable battery test, wherein, when the test switch is pressed during the rechargeable battery test, both the first coil and the second coil are disabled, and wherein the first relay switch is configured to relay the terminal voltage to the primary winding and to power up the transformer.

\* \* \* \* \*